Sept. 23, 1969  J. F. SUTHERLAND  3,468,164

OPEN THERMOCOUPLE DETECTION APPARATUS

Filed Aug. 26, 1966

WITNESSES:

INVENTOR
James F. Sutherland
BY
ATTORNEY 3,468,164
OPEN THERMOCOUPLE DETECTION APPARATUS
James F. Sutherland, Pittsburgh, Pa., assignor to Westinghouse Electric Corporation, Pittsburgh, Pa., a corporation of Pennsylvania
Filed Aug. 26, 1966, Ser. No. 575,454
Int. Cl. G01k 7/00
U.S. Cl. 73—343                                         3 Claims

ABSTRACT OF THE DISCLOSURE

There is disclosed an open thermocouple detection circuit which provides a continuous test signal to selected thermocouples to be tested. In the case of a faulty or open thermocouple the full test signal, having an opposite polarity compared to the normal thermocouple output signal, is applied to the output signal sensing device. A decoupling circuit is operative with a test signal oscillator transformer to prevent common mode voltage and offset current flow through the test signal supply to ground.

---

Figure 1:
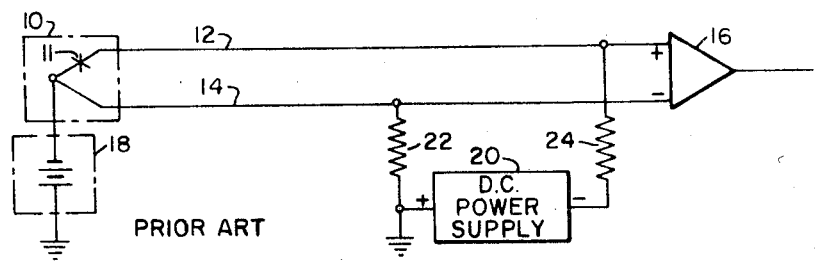

The present invention relates to an open thermocouple detection system, and more particularly, to a detection system operative with a plurality of thermocouple transducer devices such as are provided to sense the operation of respective portions of a process controlled by a digital control system. In this type of application, the possibility always exists that any one of the thermocouple devices could open or become faulty to cause its associated feedback loop to lose control of its associated portion of the controlled process.

It has been generally known in the prior art to provide a real time digital control system for an industrial process which is adapted to be followed by a plurality of thermocouple transducers, wherein each involved thermocouple output signal voltage is periodically scanned, converted into a digital signal and then stored in a suitable memory device. A serious process control problem arises when any thermocouple opens up to become defective and to cause the digital control system feedback loop associated with that thermocouple to lose control of the involved portion of the controlled industrial process. One prior art faulty thermocouple detection system for application in this type of situation employed a grounded power supply to obtain the test current through each thermocouple, and was operative such that an open break in a thermocouple could occur and not be noticed by the fault detection system because of the presence of common mode voltage signals which overcome the presence or the absence of the test current. Another prior art faulty thermocouple detection system employed a single floating power source for a given plurality of thermocouples to be tested, but it suffered from the difficulty that the particular thermocouple circuit having the highest common mode voltage applied to it by the industrial process portion associated with that thermocouple was effective to pull the isolated power supply circuit up or down depending upon the common mode voltage polarity and this caused offset errors in the reading of the other thermocouple voltages during a multiple signal scan period.

It is an object of the present invention to provide an improved faulty thermocouple detection system, wherein a normal operating thermocouple voltage drop will not be measurable, but an open or faulty thermocouple circuit will better provide a test current that can be sensed and will be of a suitable polarity direction to be detected by the subsequent scanner apparatus.

In accordance with the present invention, an open thermocouple detection circuit is provided including a transformer coupled oscillator device which provides a desired frequency test signal to the secondary winding of its associated transformer, which test signal is then rectified and filtered. A high impedance decoupling circuit is provided to attenuate the rectified test signal level to a value that is suitable for application in parallel to the thermocouples to be tested. The oscillator transformer is effective to isolate any present common mode voltages to prevent offset current flow through this power supply to ground. Each thermocouple to be tested provides a relatively low impedance path to the flow of test current. It is only in the case of a faulty or open thermocouple that the full test signal, having a chosen opposite polarity compared to the normal thermocouple output voltage, is applied to the output signal sensing device as an identifiable fault signal that can cause the digital control system to respond to this faulty condition.

Figure 2:
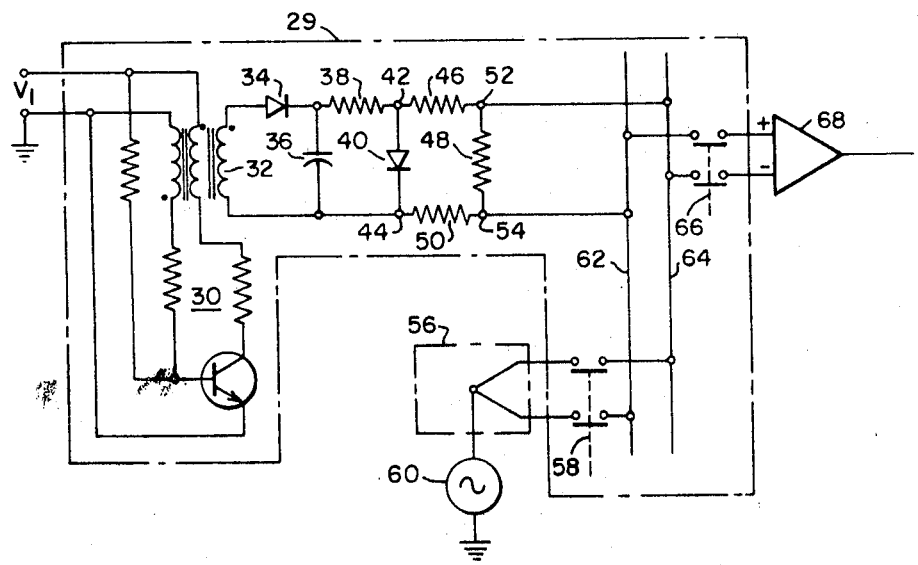

Further objects, features and advantages of the present invention will be apparent with reference to the following specification and drawing, in which:

FIGURE 1 is an illustrative schematic showing of typical prior art open thermocouple detection system, and FIG. 2 is a schematic diagram showing the detection circuit of the present invention.

In FIGURE 1, there is shown a thermocouple 10 coupled through conductors 12 and 14 to an output signal sensing amplifier device 16. In the normal operation of the thermocouple 10, the provided output signal in the order of 50 millivolts has the polarity indicated at the input terminals of the amplifier device 16. A typical common mode voltage source 18 is shown connected to the thermocouple 10, such that a negative potential relative to ground is applied to the thermocouple 10. This common mode voltage in a typical industrial process may be in the order of from 0 to 40 volts D.C.

A direct current power supply 20 is shown having its positive output terminal connected through a resistor 22 to the conductor 14 and having its negative output terminal connected through a resistor 24 to the conductor 12. The positive output terminal of the power supply 20 is connected to ground as shown in FIG. 1.

In FIG. 2, there is shown the detection circuit in accordance with the present invention and including a transformer coupled blocking oscillator 30 having its output secondary winding 32 connected through a rectifying diode 34 and a filter capacitor 36, a voltage dropping resistor 38 and a silicon diode 40 for providing across output terminals 42 and 44 the desired test signal in accordance with the teachings of the present invention. The silicon diode 40 is employed as a voltage dropping device and in effect the forward drop of that diode is utilized to provide the desired output test signal. A signal decoupling circuit including resistors 46, 48 and 50 is provided to further attenuate the provided test signal and additionally to decouple the test signal power supply from the plurality of thermocouple devices connected in parallel across the output terminals 52 and 54. A thermocouple 56 is shown connected through the contacts of a point selection relay 58 for effecting the connection of a test signal in a serial flow manner through the thermocouple 56. The common mode voltage supply 60 is symbolically shown to energize the thermocouple with the industrial process common mode voltage relative to ground.

Conductors 62 and 64 are provided to parallel connect a desired plurality of thermocouple devices, including the thermocouple 56, for common monitoring by the test signal power supply shown in FIG. 2. The contacts of a bus relay 66 may be sequentially closed as desired to cause the output signal sensing amplifier 68 to sense a particular desired signal provided by one of the thermocouples or provided by the test signal power supply as will be later described in greater detail.

In the operation of the apparatus shown in FIG. 1, if the common mode voltage at a given instant of time is negative as shown and a break or fault occurs at the point 11 in the thermocouple device, the resulting input signal to the scanner amplifier 16 will not reverse polarity as compared to a normal thermocouple output signal and the open condition of the thermocouple and resulting fault error in the signal received by the amplifier 16 is not detected. This is because the conductor 14 senses the negative value of the common mode voltage and applies it to the negative input terminal of the scanner amplifier 16, as is done with the normal operation output signal provided by the thermocouple 10.

A typical industrial process control system may be assured to the customer of having an operating accuracy in the order of plus or minus 0.1% of a normal condition signal sensed value. One of the provided and permitted errors is the test voltage utilized in accordance with the teachings of the present invention which may be in the order of .02% of the allowed error. A normal thermocouple output signal may be in the order of 50 millivolts up scale as sensed by the indicated polarity of the scanning amplifier 16 shown in FIG. 1, and for normal process condition variation may go down scale at the most 6 millivolts. The test signal from the power supply 20 when operating in accordance with its designed operation is determined to provide, upon a detected thermocouple fault condition, a 50 millivolt test signal in a negative direction down scale such that in effect it is a reversed polarity signal sensed and readily identified by the scanning amplifier 16. However, for a system operation where the common mode voltage is negative as shown in FIG. 1 and the thermocouple breaks open or faults at the point 11 as shown in FIG. 1, the resulting fault condition signal to the scanner amplifier 16 will not reverse polarity and therefore this open or fault condition of the thermocouple is not detected.

The open thermocouple detection circuit shown in FIG. 2 is less expensive and more reliable in operation than the prior art attempts to solve this problem of open thermocouple detection. The detection circuit shown in FIG. 2 can be mounted on the same printed circuit board 29 as the conventional analog point selector relays, with one of the latter being sequentially closed when it is desired to take a reading of the temperature signal of its associated thermocouple. The oscillator 30 delivers a 2.5 kc. signal to the transformer secondary 32 where it is rectified and filtered by the rectifier 34 and capacitor 36. The capacitor 36 is a small capacitor provided to filter out the 2.5 kc. ripple. The silicon diode 40 provides regulation of the output voltage to about 550 millivolts in accordance with the forward drop of that diode. The output resistors 46, 48 and 50 attenuate this latter voltage to a 50 millivolt level, which is placed across the analog signal bus conductors 62 and 64. Since the transformer of the oscillator 30 isolates the 50 millivolt voltage source from any system ground condition, common mode voltage on the analog bus comprising the conductors 62 and 64 will not circulate any offset current through the power supply to ground.

The detection circuit as shown in FIG. 2 is operative to circulate continuously a small test current through each thermocouple to be monitored. A typical thermocouple will have an impedance of 100 ohms or less, and the normal voltage drop due to this test current across a good thermocouple circuit will not be meaurable with the scanning amplifier 68 provided for this purpose. However, when one of the thermocouple circuits opens up or faults accidentally, then the test current from the power supply shown in FIG. 2 will not be shunted by the low impedance thermocouple but instead will flow into the scanning amplifier 68 in a reverse polarity direction due to the connection of terminal 52 to the bus 64 and the connection of negative terminal 54 to the bus 62 to cause the output of the amplifier 68 to reverse its normal polarity and thereby the open thermocouple condition can be readily detected by subsequent scanning or monitoring hardware or software associated with the digital control system with which the detection circuit shown in FIG. 2 is operative.

Suitable component values for utilization in the actual parctice of the present invention and in accordance with the circuit of FIGURE 2 are as follows:

$V_1$ = 26 volts A.C.
$R_{38}$ = 1500 ohms
$R_{46}$ = 2.5 megohms
$R_{48}$ = 0.5 megohms
$R_{50}$ = 2.5 megohms

I claim:

1. In defective thermocouple detection apparatus, with said thermocouple normally being energized by common mode voltages and providing a temperature condition signal to be sensed, the combination of monitor signal means operative to energize said thermocouple with a control signal with said thermocouple operating as a substantially shunt low impedance path when not defective and operating as a high impedance path when defective, signal sensing means responsive to both the temperature condition signal and the control signal, with said monitor signal means including a signal decoupling circuit connected to said thermocouple and operative to substantially prevent any undesired common mode voltage leakage to ground potential through said monitor signal means, with said signal sensing means being primarily responsive to said temperature condition signal when said thermocouple is normally operating and being responsive to said control signal when said thermocouple is defective.

2. The defective thermocouple detection apparatus of claim 1, with said control signal having a polarity different than said temperature condition signal, and with said signal sensing means being responsive only to said temperature condition signal when said thermocouple is normally operating and being responsive only to said control signal when said thermocouple is defective.

3. The defective thermocouple detection apparatus of claim 1, with said monitor signal means being operative to energize continuously said thermocouple with a control signal having a polarity opposite to said temperature condition signal, and with said signal sensing means being responsive to said control signal when the impedance of said thermocouple becomes high due to the thermocouple being defective.

References Cited

UNITED STATES PATENTS 3,120,758 2/1964 Craddock et al.
2,576,892 11/1951 Stanton _____ 340—214 XR

FOREIGN PATENTS 897,938 5/1962 Great Britain.

JOHN W. CALDWELL, Primary Examiner

D. K. MYER, Assistant Examiner

U.S. Cl. X.R.

73—359; 324—51; 331—112; 340—181, 228, 409